United States Patent
Song et al.

(10) Patent No.: US 9,458,979 B2
(45) Date of Patent: *Oct. 4, 2016

(54) SIGNAL LAMP FOR VEHICLE HAVING A LIGHT GUIDE AND MIRROR HOUSING AND LAMP HOUSING WITH REFLECTION UNIT AND SUPPORT UNIT

(71) Applicant: SL Corporation, Daegu (KR)

(72) Inventors: Do-Yoon Song, Gyeongbuk (KR); Yong-Hwan Kim, Gyeongbuk (KR)

(73) Assignee: SL Corporation, Daegu (KR)

(*) Notice: Subject to any disclaimer, the term of this patent is extended or adjusted under 35 U.S.C. 154(b) by 409 days.

This patent is subject to a terminal disclaimer.

(21) Appl. No.: 14/101,988

(22) Filed: Dec. 10, 2013

(65) Prior Publication Data

US 2014/0169017 A1   Jun. 19, 2014

(30) Foreign Application Priority Data

Dec. 14, 2012  (KR) .................. 10-2012-0146557
Nov. 7, 2013   (KR) .................. 10-2013-0134858

(51) Int. Cl.
*F21S 8/10*    (2006.01)
*B60Q 1/26*    (2006.01)
(Continued)

(52) U.S. Cl.
CPC .......... *F21S 48/234* (2013.01); *B60Q 1/2607* (2013.01); *B60Q 1/2665* (2013.01); *B60Q 1/28* (2013.01); *B60Q 1/34* (2013.01); *F21S 48/215* (2013.01); *F21S 48/2206* (2013.01); *F21S 48/2212* (2013.01); *F21S 48/2225* (2013.01); *F21S 48/2231* (2013.01); *F21S 48/2237* (2013.01); *F21S 48/2268* (2013.01); *F21S 48/2281* (2013.01); *F21S 48/238* (2013.01); *F21S 48/24* (2013.01)

(58) Field of Classification Search
CPC .... B60Q 1/2665; B60Q 1/28; B60Q 1/1207; B60Q 1/34; B60R 1/1207; F21S 48/234
See application file for complete search history.

(56) References Cited

U.S. PATENT DOCUMENTS 5,207,492 A * 5/1993 Roberts ............... B60Q 1/2665
                                                340/468
6,511,192 B1 * 1/2003 Henion ............... B60Q 1/2665
                                                248/476

(Continued)

FOREIGN PATENT DOCUMENTS

CN    102889535 A    1/2013
JP    2011-146376 A  7/2011
KR    20-0323249 Y1  8/2003

(Continued)

*Primary Examiner* — Robert May
(74) *Attorney, Agent, or Firm* — Mintz Levin Cohn Ferris Glovsky and Popeo, P.C.; Kongsik Kim; Colleen H. Witherell

(57) ABSTRACT

A lamp for a vehicle is provided and includes a signal lamp that displays a predetermined image of repetition on an exterior mirror of a vehicle. The lamp further includes a mirror housing into which a mirror is installed and a signal lamp disposed on one surface of the mirror housing. The signal lamp includes a reflection unit, a lens unit disposed at a predetermined distance apart from the reflection unit and having a half mirror installed on at least one surface thereof, and a first light source unit disposed between the reflection unit and the lens unit and is about the same distance apart from the reflection unit and the lens unit.

20 Claims, 13 Drawing Sheets

(51) Int. Cl.
*B60Q 1/28* (2006.01)
*B60Q 1/34* (2006.01)

(56) References Cited

U.S. PATENT DOCUMENTS

| | | |
|---|---|---|
| 7,347,598 B2 | 3/2008 | Seguchi |
| 2013/0128601 A1 | 5/2013 | Kim et al. |

FOREIGN PATENT DOCUMENTS

| | | |
|---|---|---|
| KR | 10-2011-0038667 | 6/2011 |
| KR | 20-0458501 Y1 | 2/2012 |
| KR | 10-2013-0011779 A | 1/2013 |
| KR | 10-2013-0055434 A | 5/2013 |

* cited by examiner

SIGNAL LAMP FOR VEHICLE HAVING A LIGHT GUIDE AND MIRROR HOUSING AND LAMP HOUSING WITH REFLECTION UNIT AND SUPPORT UNIT

This application claims priority from Korean Patent Application No. 10-2012-0146557 filed on Dec. 14, 2012 and Korean Patent Application No. 10-2013-0134858 filed on Nov. 7, 2013, the disclosure of which is incorporated herein by reference in its entirety.

TECHNICAL FIELD

The present invention relates to a lamp for a vehicle, and more particularly, to a lamp for a vehicle equipped with a signal lamp that displays a predetermined image of repetition on an exterior mirror of a vehicle.

RELATED ART

Most vehicles are equipped with lamps that illuminate nearby objects for night-time driving or signaling nearby vehicles or pedestrians as to a state of driving. For example, headlights and fog lights are for illuminating purposes, and turn signal lights, taillights, brake lights, and side marker lights are for signaling purposes. Such lamps for vehicles generally use halogen lamps or high-intensity discharge (HID) lamps as light sources.

In recent years, light-emitting diodes (LEDs) have been increasingly used as lamps for vehicles. LEDs have a similar color temperature to that of sunlight, that is, a color temperature of about 5,500 K, and are thus known to cause less fatigue to human eyes than other light sources. In addition, LEDs may be miniaturized (e.g., may be manufactured in reduced sizes), and may thus improve the degree of freedom of the design of lamps. Moreover, LEDs have a longer lifespan and are thus highly economical.

As part of the efforts to simplify the structure of related-art lamps and reduce the number of processes required for manufacturing lamps, various attempts have been made to use LEDs to increase the lifespan of lamps and address the spatial limitations of related-art lamps. One or more LEDs may be used in a vehicle lamp to offer various beam patterns and maintain a sufficiently high intensity of light. Lamps for vehicles have generally been used for illumination or signaling purposes, but the importance of the design of such lamps has steadily grown. That is, not only the functional aspects (e.g., securing a clear view for safety driving) but also the aesthetic aspects of lamps may play a role in purchasing decisions of vehicles.

SUMMARY

The present invention provides a lamp for a vehicle, in which a signal lamp that displays a predetermined image of repetition is disposed on an exterior mirror of a vehicle to improve safe driving of the vehicle and improve the design aspects of the vehicle. In addition, the present invention provides a lamp for a vehicle that may reduce the manufacturing cost using a simplified structure to display an image of repetition.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, a lamp for a vehicle may include: a mirror housing into which a mirror may be installed; and a signal lamp disposed on one surface of the mirror housing, wherein the signal lamp may include a reflection unit, a lens unit which may be a predetermined distance apart from the reflection unit and may have a half mirror installed on at least one surface thereof, and a first light source unit disposed between the reflection unit and the lens unit and may be about the same distance apart from the reflection unit and the lens unit.

Since the lamp may be equipped with the signal lamp that displays an image of repetition on an exterior mirror of a vehicle, the lamp may improve the design aspects of the exterior of the vehicle. In addition, since the half mirror and the reflection unit are aligned in parallel and are about the same distance apart from the first light source unit, the lamp may effectively render a substantially uniform, undistorted image of repetition.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
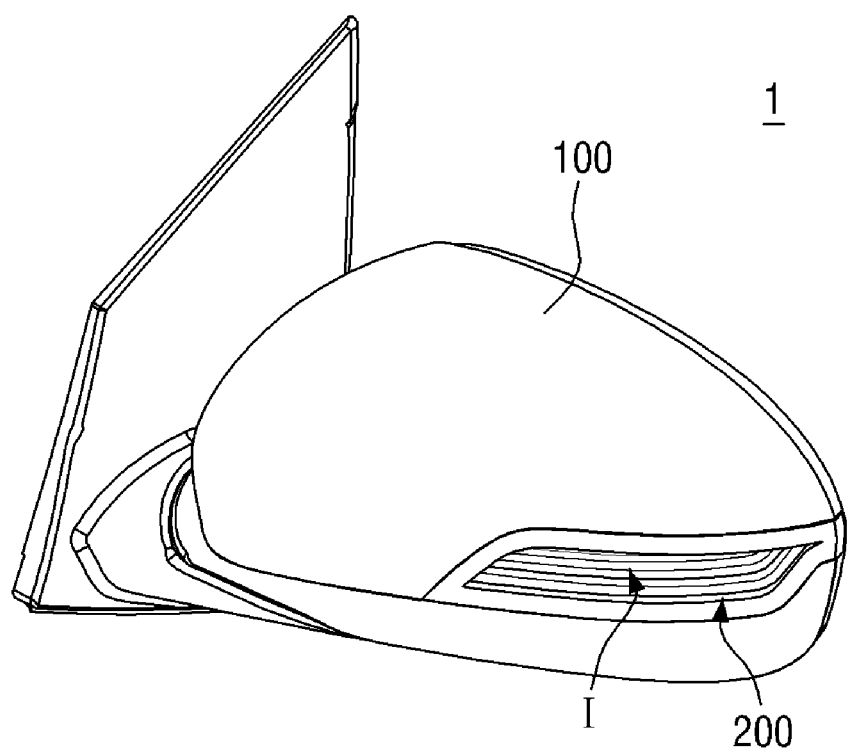
FIG. 1 is an exemplary view illustrating a lamp for a vehicle, according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The terms "comprising," "having," "including," and "containing" are to be construed as open-ended terms (i.e., meaning "including, but not limited to,") unless otherwise noted.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Example embodiments will be described with reference to perspective views, cross-sectional views, and/or plan views, in which some example embodiments are shown. Thus, the profile of an example view may be modified according to manufacturing techniques and/or allowances. The example embodiments are not intended to limit the scope but cover all changes and modifications that can be caused due to a change in manufacturing process. Thus, regions shown in the drawings are illustrated in schematic form and the shapes of the regions are presented simply by way of illustration and not as a limitation. Embodiments will hereinafter be described with reference to the accompanying drawings.

FIG. 1 is an exemplary view illustrating a lamp for a vehicle, according to an exemplary embodiment. Referring to FIG. 1, a lamp 1 for a vehicle may be, but is not limited to, a lamp that outputs an image I of repetition using a signal lamp 200 disposed at one side of an exterior mirror of a vehicle. Alternatively, the lamp 1 may be a head lamp, a rear lamp, a fog lamp, a daytime running lamp, a turn signal lamp, or a position lamp.

The lamp 1 may include a mirror housing 100 which has a mirror (not illustrated) installed at the rear of the mirror housing 100 and the signal lamp 200 disposed at one side of the mirror housing 100. The signal lamp 200 may be formed at, but is not limited to, the front of the mirror housing 100. In other words, the signal lamp 200 may be formed at one side of the mirror housing 100 or may be formed to extend from the front to the side of the mirror housing 100. The signal lamp 200 may be used as a turn signal lamp or a position lamp. The signal lamp 200 may also be used for various other purposes other than those set forth herein, such as securing a clear view for the vehicle or signaling nearby vehicles or pedestrians as to the driving state of the vehicle. In addition, the signal lamp 200 may output the repetition image I. For example, as illustrated in FIG. 1, an infinite repetition of a predetermined number of line-shaped patterns with a predetermined ratio of similarity may be detected and output as the repetition image I.

The repetition image I may be formed to repeat a predetermined pattern thereof along a direction from where the light source unit of the signal lamp 200 is located to at least one side of the signal lamp 200, and may have different brightness levels from one location to another location thereof. For example, in response to the light source unit of the signal lamp 200 being located on the outer side of the signal lamp 200 and the repetition image I being formed to repeat a pattern along a direction from the outer side of the signal lamp 200 to the inner side of the signal lamp 200, the repetition image I may have a highest brightness level on the outer side of the signal lamp 200, and the brightness of the repetition image I may gradually decrease, closer to the inner side of the signal lamp 200. The signal lamp 200 will hereinafter be described in greater detail.

Figure 2:
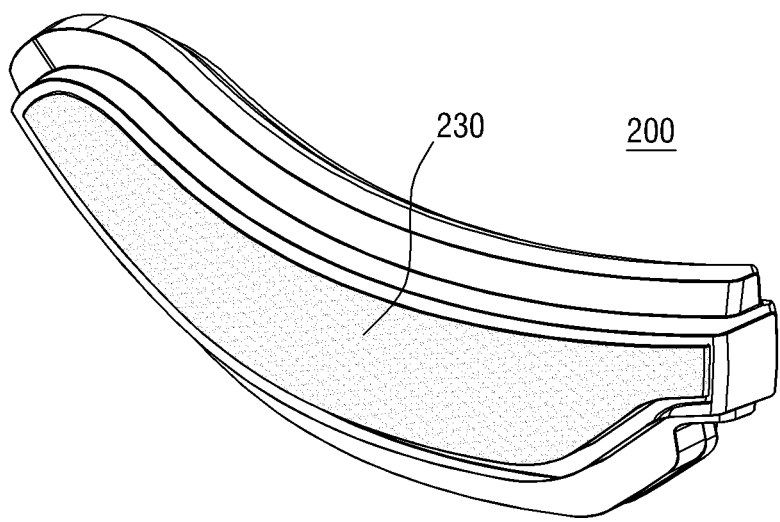
FIG. 2 is an exemplary view illustrating a signal lamp according to an exemplary embodiment of the present invention.
Figure 3:
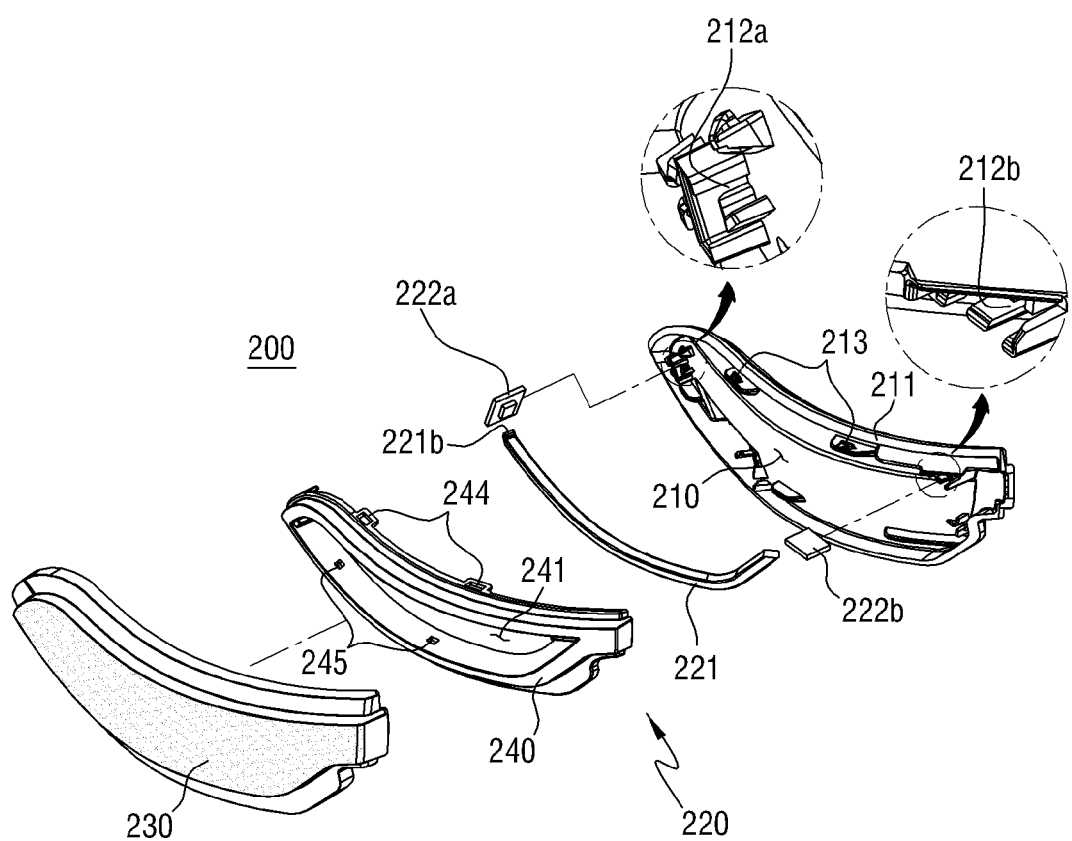
FIGS. 3 and 4 are exemplary detailed views illustrating the signal lamp illustrated in FIG. 2 according to an exemplary embodiment of the present invention.
Figure 4:
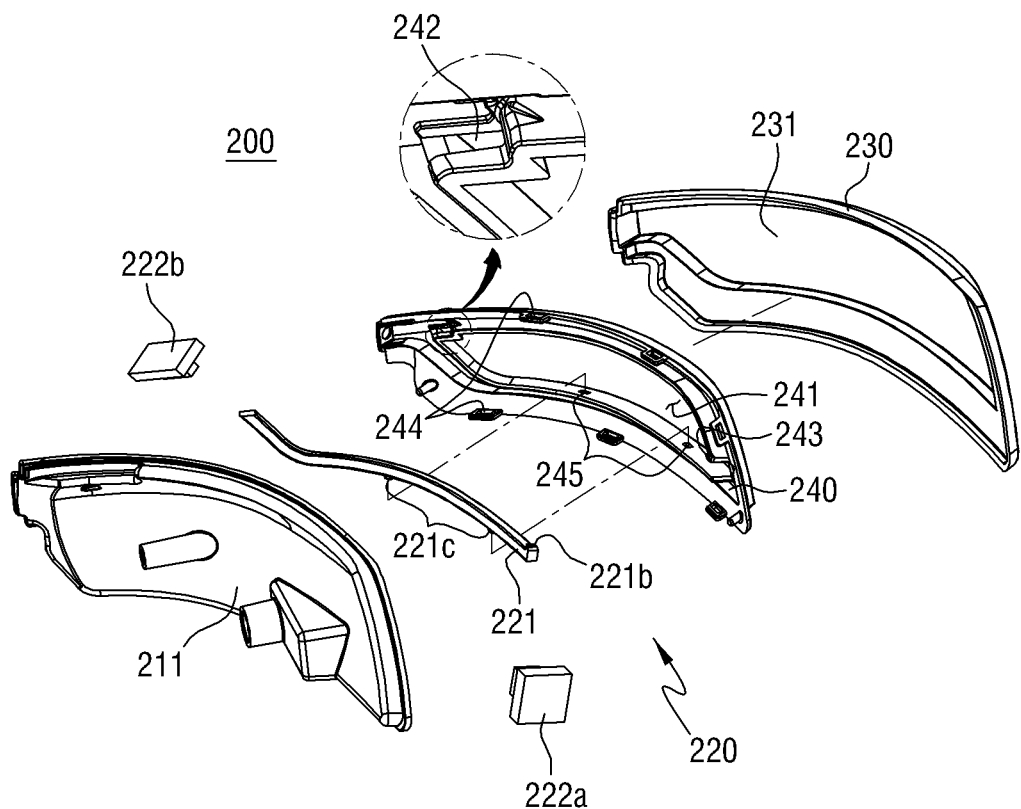
Figure 5:
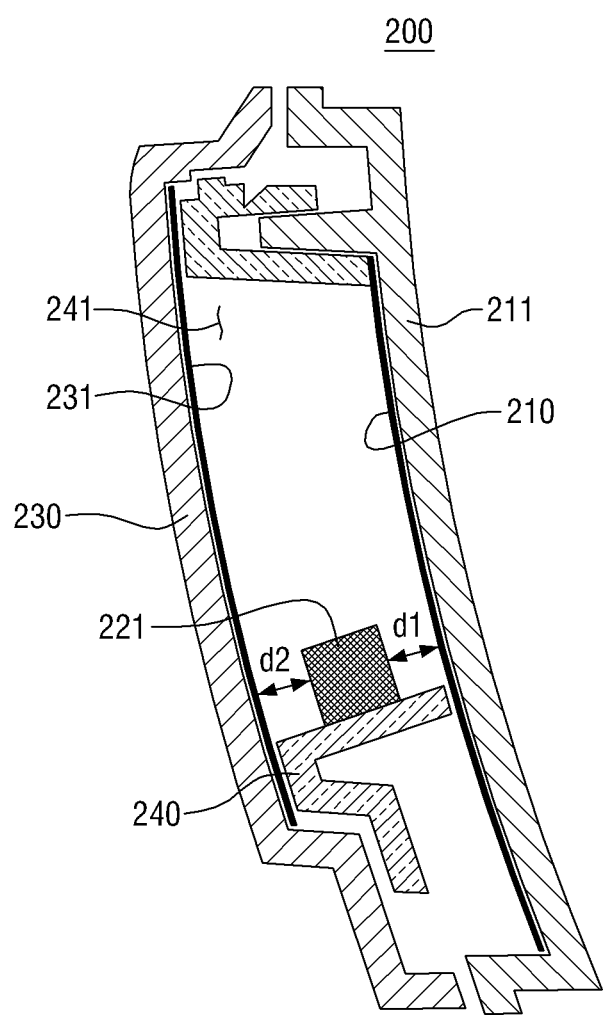
FIG. 5 is an exemplary cross-sectional view illustrating the signal lamp according to an exemplary embodiment of the present invention.

FIG. 2 is an exemplary view illustrating the signal lamp 200, and FIGS. 3 and 4 are exemplary detailed views illustrating the signal lamp 200, and FIG. 5 is an exemplary cross-sectional view illustrating the signal lamp 200.

The signal lamp 200 may include a reflection unit 210, a first light source unit 220, a lens unit 230, and a support unit 240. The reflection unit 210 may reflect light emitted from the first light source unit 220 toward the lens unit 230. For example, the reflection unit 210 may be a metal coating layer (e.g., a chrome coating layer, an aluminum coating layer, or a metal oxide coating layer) having a substantially high reflectivity and may be formed on a surface of a lamp housing 211 facing the lens unit 230. In an alternative exemplary embodiment, the reflection unit 210 may be a separate element from the lamp housing 211 to reflect light.

In the latter example, the reflection unit 210 may be disposed at one side of the lamp housing 211, and may be hook or screw coupled to the lamp housing 211 or may be bonded to the lamp housing 211 by an adhesive. Alternatively, the reflection unit 210 may be coupled to another element that supports the reflection unit 210, and may then be disposed at one side of the lamp housing 211. The reflection unit 210 may include a flat surface, a curved surface or a combination of a flat surface and a curved surface based on the angle of reflection thereof. The reflection unit 210 may reflect light so that the incidence angle and exit angle of the light are either substantially identical or different. The inclination angle or the curvature of the surface of the reflection unit 210 may vary based on the pattern of the repetition image I.

Further, the first light source unit 220 may include a light guide 221 and one or more light sources 222a and 222b disposed on one side of the light guide 221. The light guide 221 may be a linear type, and may be formed in the shape of a curved line bent at a predetermined angle. The shape of the light guide 221 may vary based on the layout of the signal lamp 200 or the pattern of the repetition image I. The light sources 222a and 222b may be implemented as light-emitting diode (LED) units. The light sources 222a and 222b may be disposed at either end of the light guide 221 to cause the light guide 221 to receive light from both ends thereof.

In response to the light sources 222a and 222b being LED units, the LEDs may be mounted on a predetermined circuit board (not illustrated). The circuit board, which is a substrate with a plurality of circuits mounted thereon, may be configured to receive a current supplied thereto from an external source or a signal indicating whether to turn on or turn off the LED units, and output an "on" signal or an "off" signal via the circuits thereon to cause the LED units to be turned on or off. The material of the circuit board may be formed of a well-known material for a substrate such as polycarbonate, polyether sulfide, polyethylene terephthalate, polyethylene naphthalate, polyphenylene sulfide, polyimide, polyamide, a liquid crystal polymer or a mixture thereof. However, the exemplary embodiment of the present invention is not limited thereto and the material of the circuit board may be any known material.

Each of the light sources 222a and 222b may include a plurality of LEDs to be turned on or off independently, and a desired pattern of light may be formed by sequentially turning on or off the LEDs of each of the light sources 222a and 222b in a predetermined pattern. The brightnesses of the LEDs of each of the light sources 222a and 222b may be adjusted separately by applying different driving currents. Since as the driving current applied to an LED increases, the brightness of the light emitted by the LED increases, various patterns of light may be generated by applying different driving currents to the LEDs of each of the light sources 222a and 222b (e.g., applying a driving current of about 5 mA to one LED and a driving current of about 10 mA to another LED) to generate beams of different intensities.

Additionally, each of the light sources 222a and 222b may also include a heat sink (not illustrated) which may be firmly attached onto the corresponding light source. The heat sinks of the light sources 222a and 222b may be formed as, but are not limited to, heat pipes. Alternatively, the heat sinks of the light sources 222a and 222b may be formed as heat spreads, and the heat spreads may be bent and extended at one side thereof to increase the area of heat transmission thereof. Each of the heat sinks of the light sources 222a and 222b may include a plurality of heat dissipation pins, and may also include, if necessary, a fan to rapidly cool off the heat from the corresponding heat sink. Further, heat pads (not illustrated) may be formed between the light sources 222a and 222b and the heat sinks of the light sources 222a and 222b to make the surfaces of contact between the light sources 222a and 222b and the heat sinks of the light sources 222a and 222b substantially even and to improve the efficiency of transmission of heat.

The light sources 222a and 222b may be inserted into grooves 212a and 212b, respectively, formed on the lamp housing 211. However, the location of the light sources 222a and 222b is not limited to that set forth herein. In other words, the location of the light sources 222a and 222b may vary based on the shape of the light guide 221 and the location of parts of the light guide 221 upon which light is incident.

Figure 6:
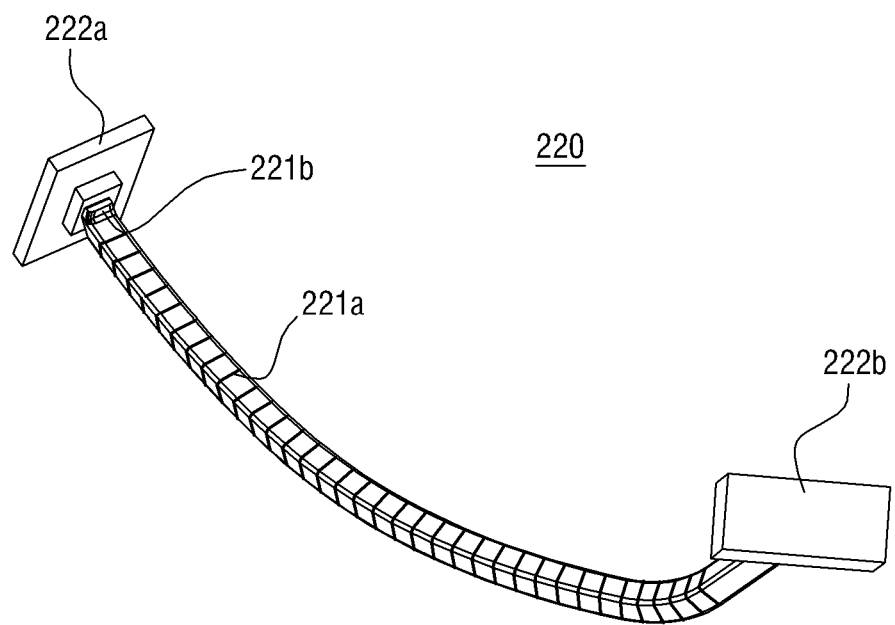
FIG. 6 is an exemplary view illustrating a light source unit according to an exemplary embodiment of the present invention.

Referring to FIG. 6, an optic 221a may be formed within the light guide 221 to uniformly distribute light emitted from the light sources 222a and 222b throughout the light guide 221. The optic 221a may be formed on a part of or the entire light guide 221. The shape of the optic 221a and the pattern of distribution of the optic 221a in the light guide 221 may vary. In a non-limiting example, the light sources 222a and 222b may be disposed at either end of the light guide 221, but the location and quantity of the light sources 222a and 222b may vary based on the layout and the light intensity of the signal lamp 100. In addition, in another non-limiting example, one or more LEDs may be used as each of the light sources 222a and 222b, but various other light sources, such as bulbs, may be used as the light sources 222a and 222b.

The lens unit 230 may include a half mirror 231 formed on a surface of the lens unit 230 facing the reflection unit 210. The lens unit 230 may be coupled to the outer circumferential end of the lamp housing 211, and may thus form space in which to accommodate various elements of the signal lamp 100. The half mirror 231 of the lens unit 230 may reflect some of light incident upon the lens unit 230 and transmit the rest of the incident light through the lens unit 230. The half mirror 231 may be coated with a metal coating layer such as a chrome coating layer, an aluminum coating layer or a metal oxide coating layer, and the metal coating layer may be formed by spin coating, spray coating, sputtering deposition, vacuum deposition, or plasma deposition.

The half mirror 231 may include a polarizing layer configured to either polarize light of a predetermined wavelength or polarize light in a predetermined manner (e.g., pattern) and a cholesteric liquid crystal layer which may be configured to selectively transmit polarized light therethrough. For example, the half mirror 231 may include a cholesteric liquid crystal layer that transmits therethrough some of the light emitted from the first light source unit 220 and reflects non-polarized light incident thereupon extraneous to the lens unit 230.

During daytime driving, when the first light source unit 220 is turned off, the inside of the lens unit 230 may not be seen by a human eye. In addition, during night-time driving (e.g., poor lighting conditions), the first light source unit 220 may be turned on, and may operate as a lamp. Accordingly, it may be possible to provide different exterior designs for daytime driving and night-time driving. In a non-limiting example, the half mirror 231 may be formed on the inside of the lens unit 230. Alternatively, the half mirror 231 may be formed on at least one of the inside and the exterior of the lens unit 230. In another non-limiting example, the half mirror 231 may be formed as a film, rather than as a metal coating layer, and may be attached onto the lens unit 230.

Referring back to FIG. 5, the first light source unit 220 may be disposed between the reflection unit 210 and the lens unit 230 and may be about the same distance apart from the reflection unit 210 and the lens unit 230. More specifically, the light guide 221 of the first light source unit 220, where light may be generated, may be about the same distance apart from the reflection unit 210 and the half mirror 231 of the lens unit 230. In other words, the light guide 221 may be placed at a location where a distance d1 between the light guide 221 and the reflection unit 210 is about the same as a distance d2 between the light guide 221 and the half mirror 231.

By placing the light guide 221 to be about the same distance apart from the reflection unit 210 and the half mirror 231, the reflection image I may be formed to repeat a pattern at regular intervals. The sides of the light guide 221 facing the reflection unit 210 and the half mirror 231, respectively, may be parallel to the reflection unit 210 and the half mirror 231. For example, in response to the light guide 221 having a substantially rectangular cross section, the light guide 221 may have a pair of parallel sides facing the reflection unit 210 and the half mirror 231, respectively, the pair of parallel sides may be parallel to the reflection unit 210 and the half mirror 231, and the reflection unit 210 and the half mirror 231 may be parallel to each other. The sides of the light guide 221 facing the reflection unit 210 and the half mirror 231, respectively, may be substantially flat, extending in parallel to the reflection unit 210 and the half mirror 231. Alternatively, the sides of the light guide 221 facing the reflection unit 210 and the half mirror 231, respectively, may be substantially curved, having about the same curvature as the reflection unit 210 and the half mirror 231. Since the reflection unit 210, the half mirror 231 and the light guide 221 may be placed in parallel to one another, the reflection image I may be formed without being distorted.

The support unit 240 may be configured to support the first light source unit 220. In addition, the support unit 240 may be formed as a bezel that has an opening 241 of a predetermined size and may be disposed between the reflection unit 210 and the lens unit 230. The first light source unit 220 may be disposed on a side of the outer circumferential end of the opening 241, and the first side of the outer circumferential end of the opening 241 where the first light source unit 220 is located may allow the light guide 221 to be aligned in parallel to the reflection unit 210 and the half mirror 231. For example, in response to the light guide 221 having a substantially rectangular cross section, the first side of the outer circumferential end of the opening 241 may be configured to have a surface perpendicular to the reflection unit 210 and the half mirror 231. As a result, in response to the light guide 221 being placed in the support unit 240, the reflection unit 210 and the half mirror 231 may be aligned in parallel to a pair of parallel sides of the light guide 221.

When the light guide 221 has a substantially rectangular cross section, the first side of the outer circumferential end of the opening 241 may be formed to be perpendicular to the reflection unit 210 and the half mirror 231. The angle between the first side of the outer circumferential end of the opening 241, by which the light guide 221 may be aligned in parallel with the reflection unit 210 and the half mirror 231, and the reflection unit 210 or the half mirror 231 may vary based on the cross-sectional shape of the light guide 221. When the reflection unit 210, the half mirror 231 and a pair of sides of the light guide 221 facing the reflection unit 210 and the half mirror 231, respectively, are formed to be curved, the light guide 221 may also be aligned in parallel with the reflection unit 210 and the lens unit 230 by adjusting the angle between the first side of the outer circumferential end of the opening 241 and the reflection unit 210 or the half mirror 231.

Figure 7:
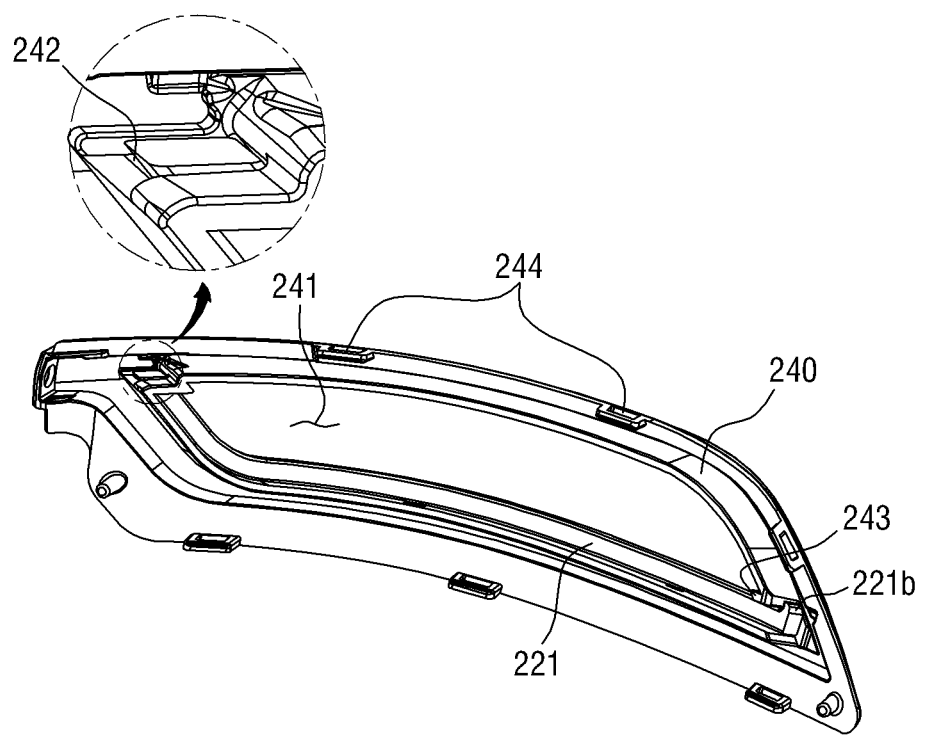
FIG. 7 is an exemplary view illustrating a light guide and a support unit according to an exemplary embodiment of the present invention.
Figure 8:
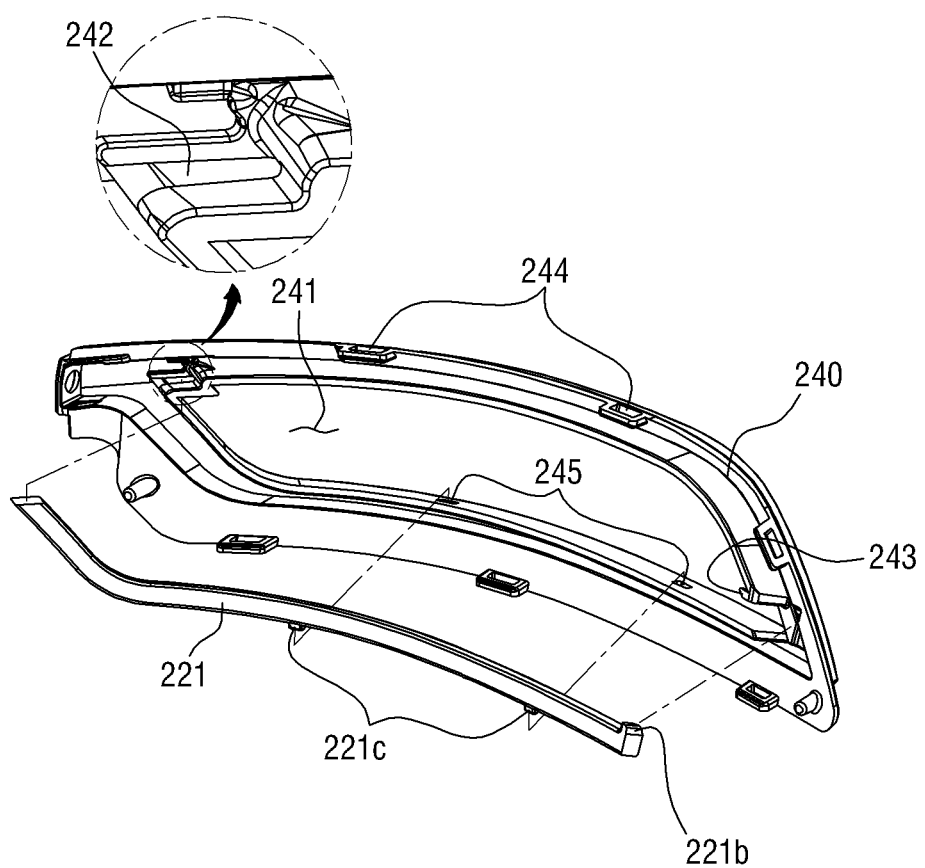
FIG. 8 is an exemplary detailed view illustrating the light guide and the support unit according to an exemplary embodiment of the present invention.

Referring to FIGS. 7 and 8, the support unit 240 may include an insertion bore 242 into which one end of the light guide 221 may be inserted and a recess 243 which may be hook coupled to and thus engage with, a protrusion 221b formed on the other end of the light guide 221. One or more coupling grooves 244 may be formed at the outer circumferential end of the support unit 240. The coupling grooves 244 may be hook coupled to, and thus engage with, protrusions 213 formed on the lamp housing 211. For example, the support unit 240 may be hook coupled to the lamp housing 211. Alternatively, the support unit 240 may be screw coupled or slidably coupled to the lamp housing 211, or may be bonded to the lamp housing 211 by an adhesive. Further, the support unit 240 may be coupled to the lens unit 230, rather than to the lamp housing 211.

Fixing grooves 245 into which fixing protrusions 221c formed on the light guide 221 may respectively inserted may be formed on the first side of the outer circumferential end of the opening 241 of the support unit 240 where the light guide 221 may be located. Due to the presence of the insertion bore 242, the recess 243, and the fixing grooves 245, the support unit 240 may align the light guide 221 therein. Accordingly, in response to the light guide 221 being coupled to the support unit 240 and the support unit 240 being coupled to the lamp housing 211, the light sources 222a and 222b may be disposed at either end of the light guide 221.

In a non-limiting example, the light guide 221 may be coupled to the support unit 240, and the light sources 222a and 222b may be installed within the lamp housing 211. Alternatively, the light guide 221 and the light sources 222a and 222b may all be installed within the support unit 240. The support unit 240 may be optional when another structure or element used to align the first light source unit 220 is provided (particularly, the light guide 221). In another non-limiting example, one first light source unit 220 may be disposed on the first side of the outer circumferential end of the opening 241 of the support unit 240. Alternatively, a plurality of first light source units 220 may be provided.

Figure 9:
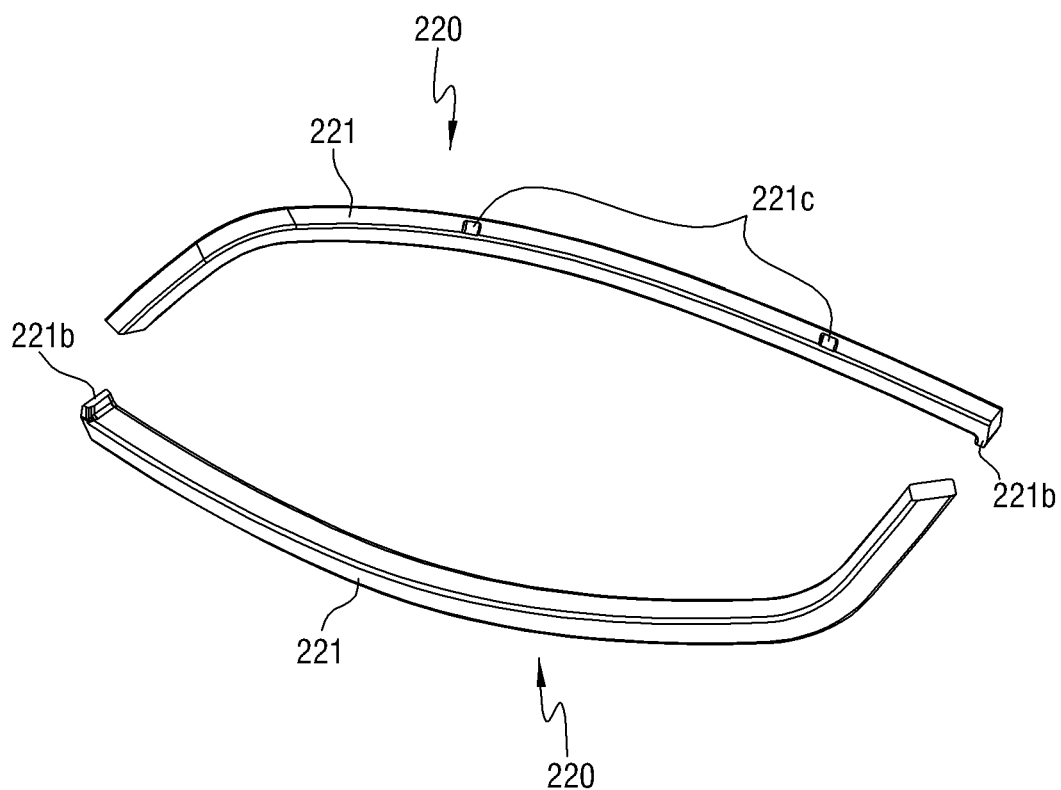
FIG. 9 is an exemplary view illustrating a light source unit according to another exemplary embodiment of the present invention.

For example, referring to FIG. 9, two first light source units 220 may be provided to be in symmetry with each other. In this exemplary embodiment, the two first light source units 220 may be disposed on opposite sides of the outer circumferential end of the support unit 240, and a symmetrical repetition image I, unlike the repetition image I illustrated in FIG. 1, may be generated. No light sources are illustrated in FIG. 9 for convenience, but it is obvious that light sources 222a and 222b may be disposed at locations on each of the light guides 221 of the two first light source units 220.

In response to light emitted from the first light source unit 220 being repeatedly reflected between the reflection unit 210 and the half mirror 231 the signal lamp 200 may form the repetition image I. For example, referring to FIG. 10, in response to light L1 generated by the light guide 221 being incident upon a first location P1 on the half mirror 231, some of the incident light L1 (e.g., a first portion of incident light) may transmit through the lens unit 230, as indicated by reference numeral L2, and the rest of the incident light L1 (e.g., a second portion of incident light) may be reflected and travel toward the reflection unit 210, as indicated by reference numeral L3. The angle of incidence and the angle of reflection may be about the same or different at the location P1.

The light L3 reflected light from the half mirror 231, may be incident upon a second location on the reflection unit 210, may be reflected back toward the half mirror 231 and then may be incident upon a third location P3 on the half mirror 231, which is different from the first location P1. Some of the light incident upon the location P3 (e.g., a first portion of light incident upon location P3) may transmit through the half mirror 231, as indicated by reference numeral L4, and some of the light incident upon the location P3 (e.g., a second portion of the light incident upon the location P3) may be reflected and travel back to the reflection unit 210, as indicated by reference numeral L5. The angle of incidence and the angle of reflection may, or may not, be about the same at each of the locations P2 and P3.

Figure 10:
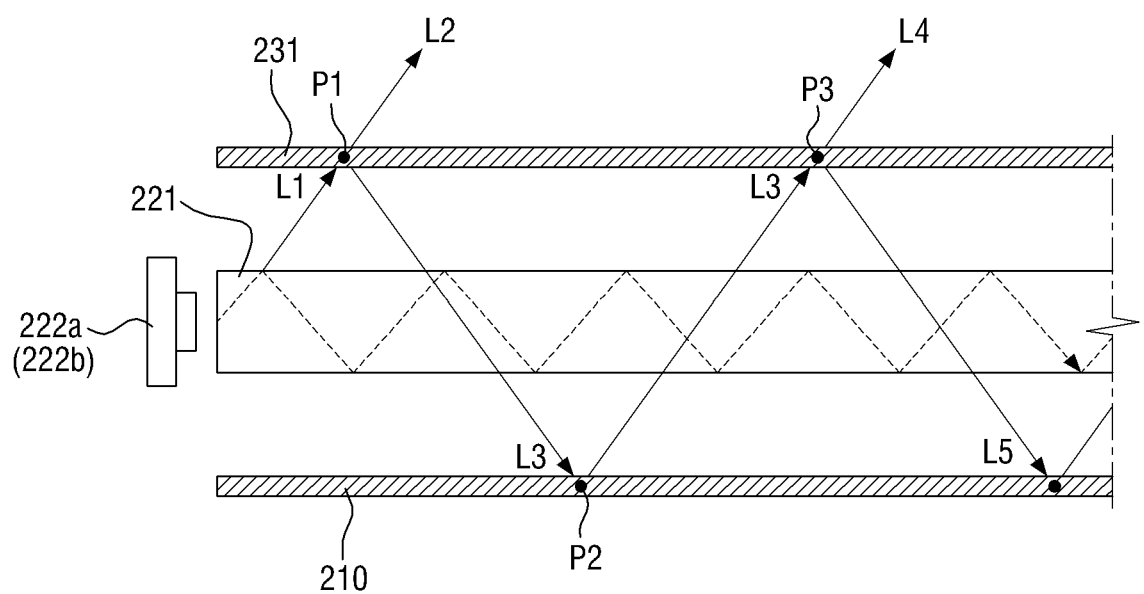
FIG. 10 is an exemplary schematic view illustrating an optical path of the signal lamp according to an exemplary embodiment of the present invention.

The repetition image I may be generated due to repeated transmissions and reflections of light between the reflection unit 210 and the half mirror 231. Since the intensity of the light L4 at the location P3 may be substantially lower than the intensity of the light L2 at the location P1, the brightness at the location P3 may be substantially lower than the brightness at the location P1. In other words, the signal lamp 200 may form the repetition image I due to repeated transmissions and reflections of light as illustrated in FIG. 10.

Figure 11:
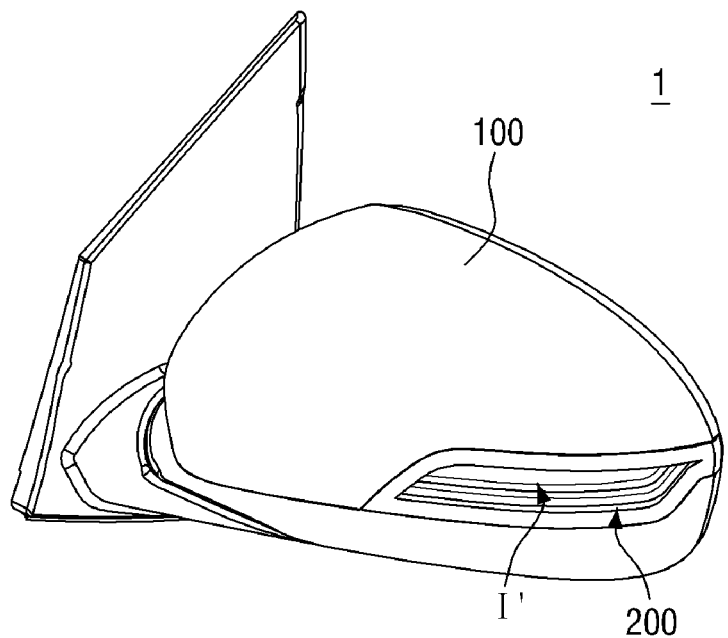
FIG. 11 is an exemplary view illustrating the displaying of an image of repetition by the lamp for a vehicle when the light source unit is turned off according to an exemplary embodiment of the present invention.

In a non-limiting example, the repetition image I may be formed in response to light being generated by the first light source unit 220. Alternatively, when the first light source unit 220 is turned off, a repetition image I' may be generated in response to natural light being incident upon the light guide 221 at a substantially low intensity. The repetition image I' may have a reduced brightness and a reduced number of repetitions of a pattern thereof than the repetition image I, as illustrated in FIG. 11. In another non-limiting example, the lamp 1 may be equipped with the signal lamp 200, which may be used as a turn signal lamp or a position lamp. To use the signal lamp 200 for various other purposes than those set forth herein, another light source unit may be provided in the signal lamp 200.

Figure 12:
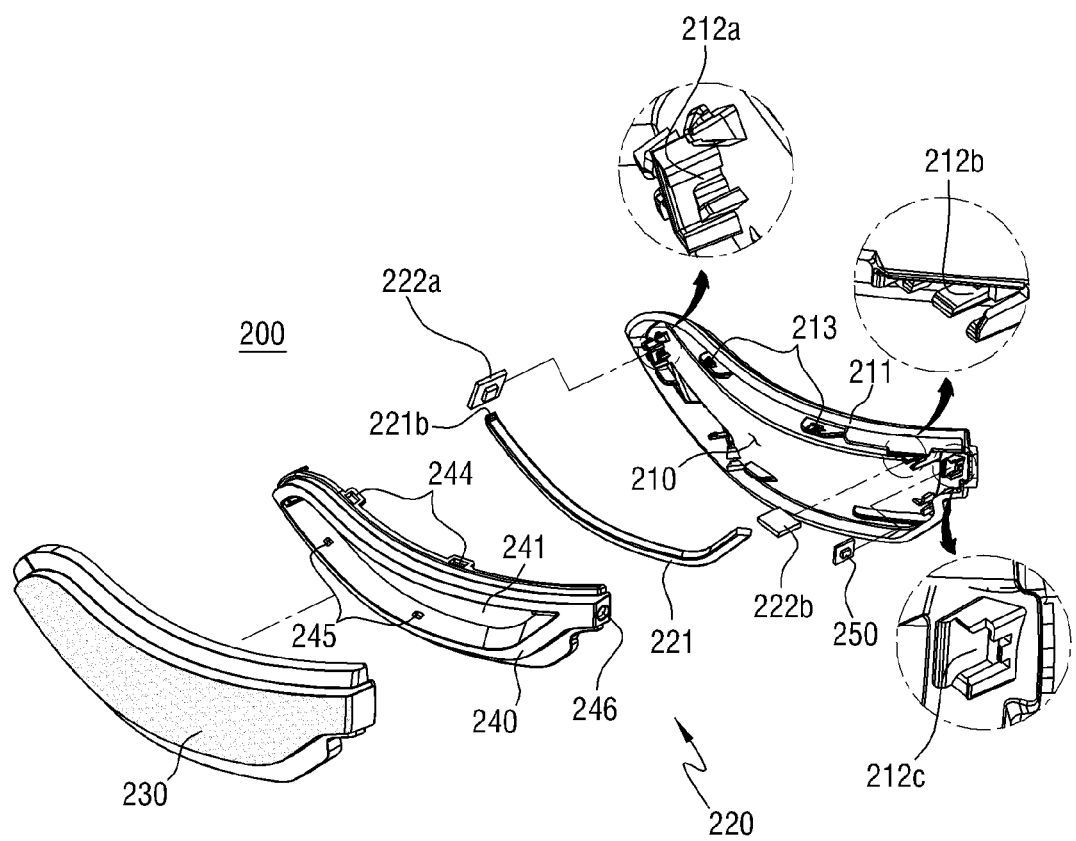
FIG. 12 is an exemplary detailed view illustrating a signal lamp according to another exemplary embodiment of the present invention.

FIG. 12 is an exemplary detailed view illustrating a lamp for a vehicle, according to another exemplary embodiment. The exemplary embodiment illustrated in FIG. 12 is the same as the exemplary embodiment illustrated in FIG. 3 except for the presence of a second light source unit 250. In FIGS. 3 and 12, like reference numerals indicate like elements, and thus detailed descriptions thereof will be omitted. Referring to FIG. 12, the second light source unit 250, unlike a first light source unit 220, may be configured to have no light guide. Alternatively, the second light source unit 250, like the first light source unit 220, may be configured to include a light guide.

The second light source unit 250 may be installed within a lamp housing 211 by being inserted into an installation groove 212c formed on the lamp housing 211 in a similar manner to that used to install light sources 222a and 222b of the first light source unit 220 within the lamp housing 211. In addition, exposure apertures 245 through which the second light source unit 250 may be exposed may be formed on a support unit 240 to emit light generated by the second light source unit 250. The first light source unit 220 and the second light source unit 250 may be used for different purposes. For example, the first light source unit 220 may be used as a position lamp, and the second light source unit 250 may be used as a signal lamp.

Figure 13:
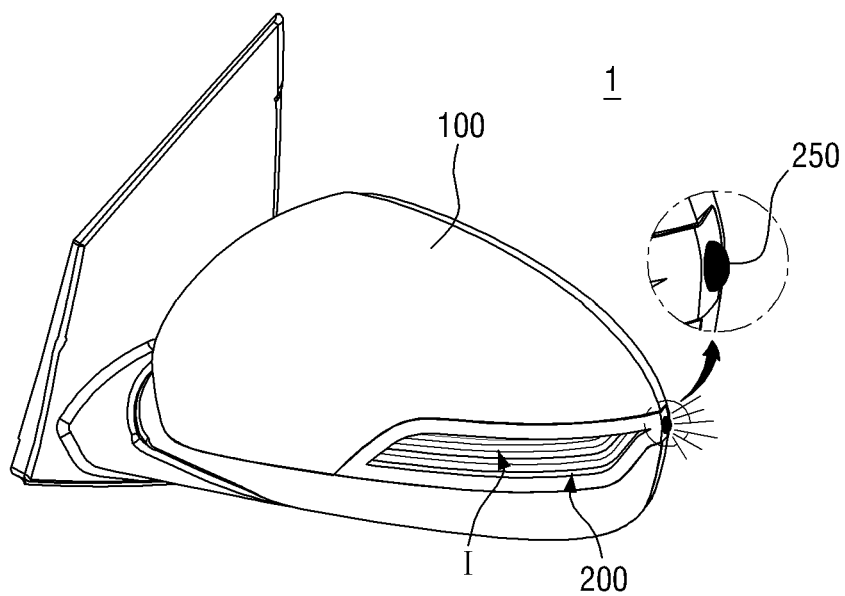
FIG. 13 is an exemplary view illustrating a lamp for a vehicle, according to another exemplary embodiment of the present invention.

Referring to FIG. 13, when a signal lamp 200 includes both the first light source unit 220 and the second light source unit 250, the signal lamp 200 may be configured to generate a repetition image I to be used as a position lamp, and emit light to be used as a turn signal lamp. Further, the second light source unit 250 may be disposed on one side of the first light source unit 220, but the location of the first light source unit 220 and the second light source unit 250 may vary based on the purpose of use of the signal lamp 200.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A lamp for a vehicle, comprising:
a mirror housing into which a mirror is installed;
a lamp housing that is disposed on a portion of the mirror housing and includes a reflection unit disposed on a portion of the lamp housing,
a lens unit that is coupled to the lamp housing so as to form a chamber between the lens unit and the lamp housing and includes a half mirror disposed on a surface portion of the lens unit;
a support unit that is coupled to the lamp housing in the chamber;
a light guide that is supported by the support unit in the chamber; and
one or more light sources that are disposed at one or both ends of the light guide,
wherein the reflection unit is parallel or substantially parallel to the half mirror or the curvature of the reflection unit is same or substantially same as that of the half mirror, and
wherein the distance between the light guide and the reflection unit is same or substantially same as the distance between the light guide and half mirror.

2. The lamp of claim 1, wherein the reflection unit is a metal coating layer formed on the lamp housing.

3. The lamp of claim 1, wherein the reflection unit is configured to reflect light, which was generated by the one or more first light sources and reflected by the half mirror, at a predetermined angle for the light to travel back toward the half mirror.

4. The lamp of claim 3, wherein an angle of incidence and an angle of exit of the light reflected by the reflection unit are same or different.

5. The lamp of claim 1, wherein the half mirror is a metal coating layer formed on, or a film attached onto, the surface portion of the lens unit.

6. The lamp of claim 1, wherein the half mirror is formed on at least one of an inside or an exterior of the lens unit.

7. The lamp of claim 1, wherein the support unit includes an opening and the light guide is disposed on a side of an outer circumferential end of the opening of the support unit.

8. The lamp of claim 7, wherein the support unit includes:
an insertion bore into which one end of the light guide is inserted;
a recess that engages with a protrusion formed on another end of the light guide; and
one or more fixing grooves into which one or more fixing protrusions formed on the light guide are respectively inserted.

9. The lamp of claim 1, wherein the light guide includes an optic formed within at least a part of the light guide.

10. The lamp of claim 1, wherein light generated by the one or more of the first light sources is reflected at a first location on the half mirror, the reflected light from the first location is reflected at a second location on the reflection unit, and the reflected light from the second location is incident upon a third location on the half mirror, which is different from the first location.

11. The lamp of claim 10, wherein an angle of incidence and an angle of exit of the light reflected by the half mirror are same or different.

12. The lamp of claim 10, wherein light transmitted through the half mirror at the first location has a greater brightness than light transmitted through the half mirror at the third location.

13. The lamp of claim 1, further comprising one or more second light sources that are disposed at a portion of the light guide, which portion is different from the portion where the one or more first light sources are disposed.

14. A lamp for a vehicle, comprising;
a mirror housing into which a mirror is installed;
a lamp housing disposed on a portion of the mirror housing; and
a lens unit coupled to the lamp housing to form a chamber disposed between the lens unit and the lamp housing and having a half mirror disposed on a surface portion of the lens unit, wherein the chamber includes a support unit, a reflector and a light guide, the support unit is coupled to the lamp housing, the light guide is supported by the support unit and at least one light source is disposed on at least one end of the light guide, wherein the reflector is parallel or substantially parallel to a surface of the lens unit that emits the light of the light guide or the curvature of the reflector is identical or substantially identical to the curvature of a surface of the lens unit that emits the light of the light guide, and wherein a distance between the light guide and the reflector is identical or substantially identical to the distance between the light guide and the lens unit.

15. The lamp of claim 14, wherein the reflector is configured to reflect light generated by the at least one light source and reflected by the half mirror at a predetermined angle for the light to travel back toward the half mirror.

16. The lamp of claim 15, wherein an angle of incidence and an angle of exit of the light reflected by the reflector are identical or different.

17. The lamp of claim 14, wherein the half mirror is formed on at least one of an inside or an exterior of the lens unit.

18. The lamp of claim 14, wherein the support unit includes an opening and the light guide is disposed on a side of an outer circumferential end of the opening of the support unit.

19. The lamp of claim 14, wherein light generated by the at least one light source is reflected at a first location on the half mirror, the reflected light from the first location is reflected at a second location on the reflector, and the reflected light from the second location is incident upon a third location on the half mirror, which is different from the first location.

20. The lamp of claim 19, wherein light transmitted through the half mirror at the first location has a greater brightness than light transmitted through the half mirror at the third location.

* * * * *